(12) United States Patent
Tan et al.

(10) Patent No.: US 10,116,224 B1
(45) Date of Patent: Oct. 30, 2018

(54) SWITCHING POWER CONVERTER CIRCUIT

(71) Applicants: F. Dong Tan, Irvine, CA (US); Ding Woo, Northridge, CA (US); Kwang Yi, Los Angeles, CA (US); Hai Hoang, Irvine, CA (US)

(72) Inventors: F. Dong Tan, Irvine, CA (US); Ding Woo, Northridge, CA (US); Kwang Yi, Los Angeles, CA (US); Hai Hoang, Irvine, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/622,800

(22) Filed: Jun. 14, 2017

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ............. H02M 3/335; H02M 3/33507; H02M 3/33576; H02M 3/33592; H02M 1/4208; H02M 1/4266; H02H 7/125; H02H 7/10; H02H 7/04; H02H 7/219
USPC ...... 363/20, 21.01, 21.06, 21.14, 44, 52, 53, 363/125, 127
See application file for complete search history.

(56) References Cited

U.S. PATENT DOCUMENTS

| | | | | | |
|---|---|---|---|---|---|
| 5,870,299 | A | * | 2/1999 | Rozman | H02M 1/38 363/127 |
| 6,104,623 | A | * | 8/2000 | Rozman | H02M 3/33561 363/127 |
| 6,128,203 | A | * | 10/2000 | Canizales Teran | G05F 1/618 307/58 |
| 6,169,683 | B1 | * | 1/2001 | Farrington | H02M 3/33592 363/127 |
| 6,188,592 | B1 | * | 2/2001 | Farrington | H02M 3/33592 363/127 |

(Continued)

OTHER PUBLICATIONS

Bottrill: "The Effects of Turning Off a Converter with Self-Driven Synchronous Rectifiers"; found on the internet at: http://www.powerguru.org/the-effects-of-turning-off-a-converter-with-self-driven-synchronous-rectifiers; Jun. 19, 2017.

(Continued)

*Primary Examiner* — Adolf Berhane
(74) *Attorney, Agent, or Firm* — Tarolli, Sundheim, Covell & Tummino LLP

(57) ABSTRACT

One example includes a switching power converter circuit. The circuit includes a gate driver configured to generate at least one switching signal in response to a feedback signal. The circuit also includes a feedback stage configured to generate the feedback signal based on an amplitude of an output voltage at an output. The circuit further includes a power stage including at least one switch and a transformer. The at least one switch can be controlled via the respective at least one switching signal to provide a primary current through a primary winding of the transformer to induce a secondary current through a secondary winding of the transformer to generate the output voltage. The power stage further includes a self-driven synchronous rectifier stage coupled to the secondary winding to conduct the secondary current from a low voltage rail through the secondary winding.

18 Claims, 4 Drawing Sheets

(56) References Cited

U.S. PATENT DOCUMENTS

| | | | |
|---|---|---|---|
| 6,304,463 B1* | 10/2001 | Krugly | H02M 3/33576 363/21.04 |
| 6,819,574 B2 | 11/2004 | Xu et al. | |
| 7,008,602 B2 | 8/2006 | Priegnitz et al. | |
| 7,333,350 B2 | 2/2008 | Williams et al. | |
| 7,362,598 B2 | 4/2008 | Schaible et al. | |
| 7,558,083 B2* | 7/2009 | Schlecht | H02M 3/335 363/21.06 |
| 8,937,468 B2 | 1/2015 | Tan et al. | |
| 9,143,028 B2 | 9/2015 | Tan et al. | |
| 2002/0110005 A1* | 8/2002 | Mao | H02M 3/33592 363/21.06 |
| 2004/0022075 A1* | 2/2004 | Perry | H02M 3/33592 363/21.01 |
| 2006/0109698 A1* | 5/2006 | Qu | H02M 3/33592 363/127 |
| 2006/0245218 A1* | 11/2006 | Tumasz | H02M 3/33592 363/89 |
| 2006/0274559 A1* | 12/2006 | Saeueng | H02M 3/33561 363/21.06 |
| 2011/0188269 A1* | 8/2011 | Hosotani | H02M 3/33592 363/21.06 |
| 2013/0094251 A1* | 4/2013 | Yin | H02M 1/08 363/21.06 |
| 2015/0117068 A1* | 4/2015 | Yin | H02M 3/33592 363/21.06 |
| 2015/0138839 A1* | 5/2015 | Seok | H02M 3/33553 363/17 |

OTHER PUBLICATIONS

Kohama, et al.: "*Analysis of Abnormal Phenomena Caused by Synchronous Rectifiers in a Paralleled Converter System*"; IEEE Transactions on Power Electronics 15.4 (2000): 670-680.

* cited by examiner

SWITCHING POWER CONVERTER CIRCUIT

GOVERNMENT SUPPORT

This invention was made with Government support. The Government has certain rights in this invention.

TECHNICAL FIELD

The present disclosure relates generally to electronics, and specifically to a switching power converter circuit.

BACKGROUND

DC-DC power converters are used to convert an unregulated source of DC power into a source of constant voltage for use in various applications. Some DC power converters include a transformer having primary and secondary windings. A switch can be coupled to the primary winding in order to control energy transfer from the primary to secondary winding. In PWM-controlled converters, the switch can be under the control of a pulse width modulator (PWM) circuit which varies the duty cycle over a switching period. Increasing switching frequency to reduce size and weight, such as required in certain applications, can rapidly increase switching losses. To offset the switching losses, various techniques of soft switching can be employed, such as those which have zero-current or zero voltage switching at turn-on and turn-off transitions, while keeping voltage and current stresses similar those in a PWM (hard-switched) converter. This is so because stress levels for switch voltage and current similar to those in a PWM (hard-switched) converters can provide the best possible efficiency in power transfer.

SUMMARY

One example includes a switching power converter circuit. The circuit includes a gate driver configured to generate at least one switching signal in response to a feedback signal. The circuit also includes a feedback stage configured to generate the feedback signal based on an amplitude of an output voltage at an output. The circuit further includes a power stage including at least one switch and a transformer. The at least one switch can be controlled via the respective at least one switching signal to provide a primary current through a primary winding of the transformer to induce a secondary current through a secondary winding of the transformer to generate the output voltage. The power stage further includes a self-driven synchronous rectifier stage coupled to the secondary winding to conduct the secondary current from a low voltage rail through the secondary winding.

Another example includes a switching power converter circuit. The circuit includes a gate driver configured to generate at least one switching signal in response to a feedback signal. The circuit also includes a feedback stage configured to generate the feedback signal based on an amplitude of an output voltage at an output. The circuit further includes a power stage comprising a pair of switches and a transformer. The pair of switches can be alternately activated via the respective pair of switching signals in a first switching phase and a second switching phase to provide a primary current through a primary winding of the transformer to induce a secondary current through a secondary winding of the transformer to generate the output voltage. The power stage further includes a pair of transistors arranged as a self-driven synchronous rectifier stage coupled to the secondary winding to conduct the secondary current from a low voltage rail through the secondary winding. The pair of transistors can be configured to alternately activate in the first and second switching phases in response to respectively conducting the secondary current in each of the first and second switching phases.

Another example includes a switching power converter circuit. The circuit includes a gate driver configured to generate at least one switching signal in response to a feedback signal. The circuit also includes a power stage including at least one switch and a transformer. The at least one switch can be controlled via the respective at least one switching signal to provide a primary current through a primary winding of the transformer to induce a secondary current through a secondary winding of the transformer to generate an output voltage. The power stage further includes a self-driven synchronous rectifier stage coupled to the secondary winding to conduct the secondary current from a low voltage rail through the secondary winding. The circuit further includes a feedback stage. The feedback stage includes an isolation transformer comprising a primary winding configured to conduct a feedback current associated with the output voltage and a secondary winding configured to generate a secondary feedback current based on the feedback current. The feedback stage further includes a rectifier configured to rectify the secondary feedback current, the feedback stage being configured to generate the feedback signal based on the rectified secondary feedback current in a temperature-compensated manner.

DETAILED DESCRIPTION

The present disclosure relates generally to electronics, and specifically to a switching power converter circuit. The switching power converter circuit can be implemented as a soft-switching power converter that includes a gate driver configured to generate at least one switching signal in response to a feedback signal that is based on an output voltage of the switching power converter. The switching power converter circuit can also include a power stage that includes at least one switch that is controlled by the respective switching signal(s) to generate a primary current flow through a primary winding of a transformer. A secondary current is thus induced in the secondary winding of the transformer, and the secondary current flows from ground to an output on which the output voltage is generated (e.g., via an output filter).

The power stage can include a self-driven synchronous rectifier stage that is configured to alternately activate to provide the secondary current from ground to flow through respective portions of the secondary winding at each of different switching phases, and thus different directions of current flow of the primary current through the primary winding. As an example, the self-driven synchronous rectifier stage can include a pair of transistors that each have a gate that is coupled to a drain of the other of the pair of transistors, such that the flow of the secondary current from ground through the activated one of the pair of transistors slowly activates the other of the pair of transistors synchronously with the activation of the switch(es) in the power stage. Accordingly, the self-driven synchronous rectifier stage provides self-activating very low resistance current paths for the secondary current in providing the output voltage at the output of the switching power converter circuit.

The switching power converter also includes a feedback stage that is configured to generate the feedback signal based on an amplitude of the output voltage. As an example, the feedback stage includes an isolation transformer that is configured to isolate a feedback current that is provided from the output with respect to the feedback stage, and thus the gate driver. The feedback current can be an AC current that induces an AC secondary feedback current that is rectified by a rectifier in the feedback stage (e.g., via a diode and an RC filter). As an example, the rectifier can also include a second diode, a second resistor, and a second capacitor that are arranged as fabrication matched components with respect to the diode and RC filter. As a result, the rectified feedback voltage that is provided by the rectifier can be temperature compensated.

Figure 1:
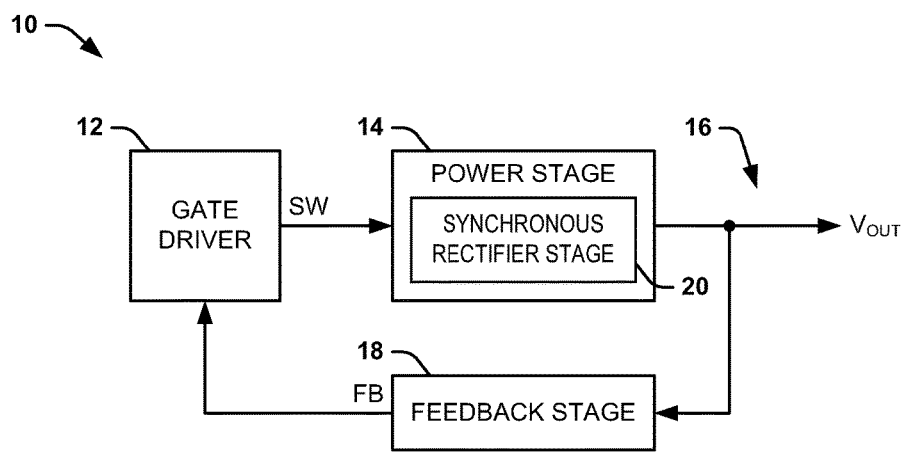
FIG. 1 illustrates an example block diagram of a switching power converter circuit.

FIG. 1 illustrates an example block diagram 10 of a switching power converter system. As an example, the switching power converter system can be configured as a double-forward power converter circuit. The switching power converter system can be implemented in any of a variety of applications that require generating a regulated output voltage $V_{OUT}$ based on an input voltage $V_{IN}$. For example, the switching power converter system can be implemented in aerospace or military applications that may require very low switching losses.

The switching power converter system includes a gate driver 12 that is configured to generate at least one switching signal SW in response to a feedback signal FB. As an example, the feedback signal FB can be generated based on the output voltage $V_{OUT}$, such that the switching signal(s) SW can be provided to regulate a substantially constant amplitude of the output voltage $V_{OUT}$. The gate driver 12 can thus be configured to generate the switching signal(s) SW in a pulse-width modulation (PWM) manner. The switching signal(s) SW are provided to a power stage 14 that includes a respective at least one switch that is controlled by the switching signal(s) SW. As an example, the power stage 14 can include a transformer, such that the switch(es) can be activated by the switching signal(s) SW to generate a primary current flow through a primary winding of the transformer. In response, a secondary current is induced in the secondary winding of the transformer, and the secondary current flows from a low voltage rail (e.g., ground) to an output 16 on which the output voltage $V_{OUT}$ is generated (e.g., via an output filter). The switching power converter system further includes a feedback stage 18 that is configured to generate the feedback signal FB based on the output voltage $V_{OUT}$, as described in greater detail below. As described in greater detail herein, the feedback stage 18 can generate the feedback signal FB in a manner that is temperature compensated, such that the feedback signal FB can be substantially unaffected by variations in temperature.

In the example of FIG. 1, the power stage 14 includes a self-driven synchronous rectifier stage 20 that is configured to alternately activate to provide the secondary current from ground to flow through respective portions of the secondary winding at each of different switching phases, and thus different directions of current flow of the primary current through the primary winding. As an example, the self-driven synchronous rectifier stage 20 can include a pair of transistors that each have a gate that is coupled to a drain of the other of the pair of transistors, such that the flow of the secondary current from ground through the activated one of the pair of transistors slowly activates the other of the pair of transistors synchronously with the activation of the switch(es) in the power stage. Accordingly, the self-driven synchronous rectifier stage 20 provides self-activating very low resistance current paths for the secondary current in providing the output voltage at the output of the switching power converter system.

Figure 2:
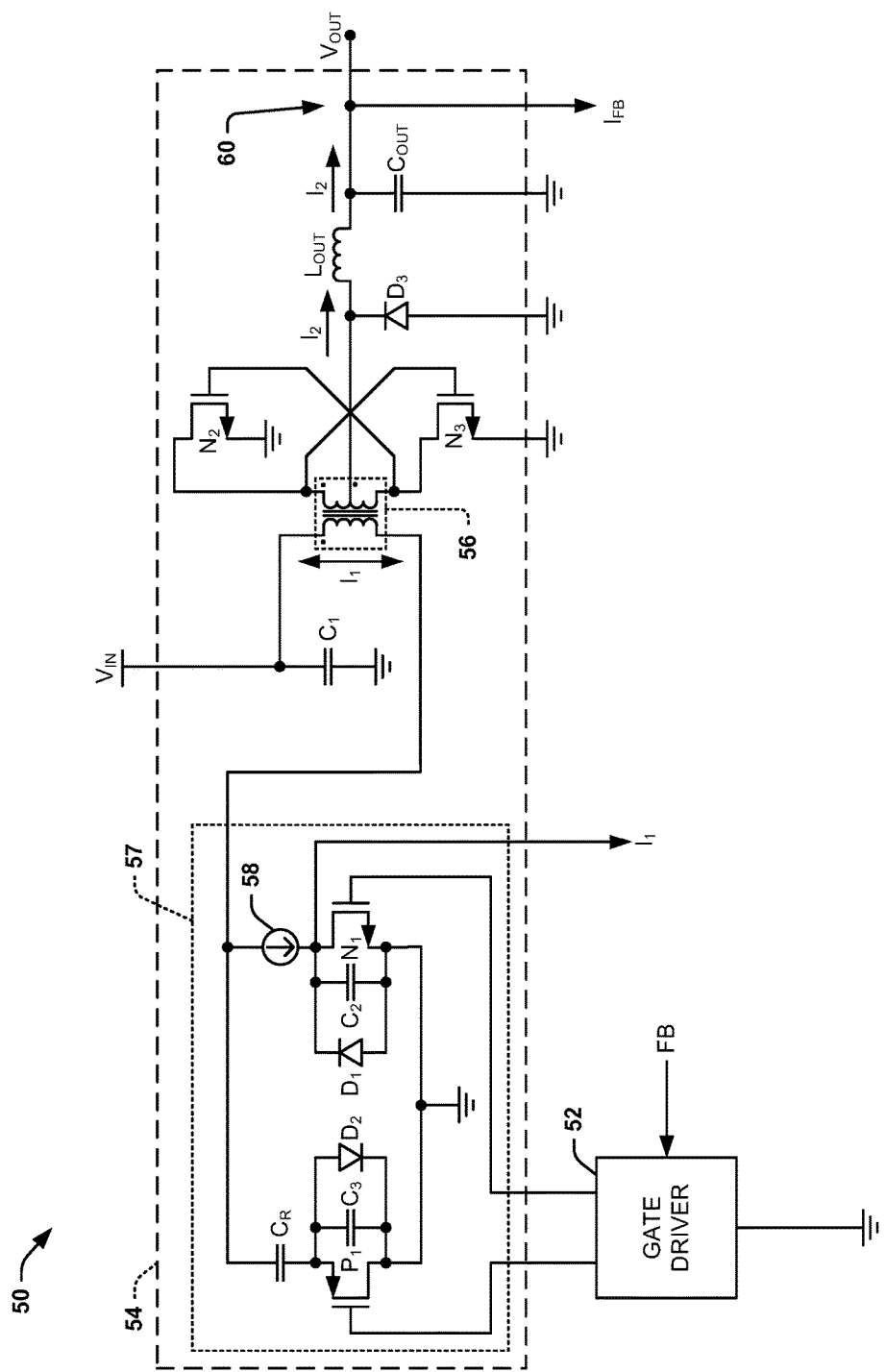
FIG. 2 illustrates an example of a switching power converter circuit.

FIG. 2 illustrates an example of a switching power converter circuit 50. The switching power converter system 50 can be implemented in any of a variety of applications that require generating a regulated output voltage $V_{OUT}$ based on an input voltage $V_{IN}$. As an example, the switching power converter circuit 50 can correspond to the switching power converter system in the diagram 10 of the example of FIG. 1.

In the example of FIG. 2, the switching power converter circuit 50 is demonstrated as a double-forward power converter, similar to as demonstrated in U.S. Pat. No. 5,973,939, which is incorporated herein in its entirety by reference. The switching power converter circuit 50 includes a gate driver 52 and a power stage 54. The power stage 54 includes a transformer 56 having a single primary winding and dual secondary windings. As an example, the transformer 56 can have each equal turns with respect to the dual secondary windings. The polarities of the primary and secondary windings are as indicated by the dots in FIG. 2. The power stage 54 also includes a switch stage 57 that includes an N-channel field effect transistor (N-FET) $N_1$ that acts as a switch to control the energy flow in the primary winding of the transformer 56. In particular, the source of the N-FET $N_1$ is coupled to a current source 58 coupled to the primary winding and a drain coupled to a low voltage rail (e.g., ground). In the example of FIG. 2, the current $I_1$ is also provided to a feedback stage, such as the feedback stage 18 in the example of FIG. 1, such as demonstrated in greater detail in the example of FIG. 5. The input voltage $V_{IN}$ is likewise coupled to the primary winding of the transformer 56 over a capacitor $C_1$. The current source 58 is therefore configured to provide a primary current $I_1$ from the input voltage $V_{IN}$ through the primary winding of the transformer 56 and through the N-FET $N_1$ in response to the N-FET $N_1$ being activated by a first switching signal $SW_1$ provided at the gate of the N-FET $N_1$ by the gate driver 52.

A P-channel FET (P-FET) $P_1$ is coupled to a reset capacitor $C_R$ at a source, and has a drain coupled to the source of the N-FET $N_1$ and the low-voltage rail. The P-FET $P_1$ in combination with the reset capacitor $C_R$ is used for resetting the core of the transformer 56 and for enabling zero-voltage switching for both the N-FET $N_1$ and the P-FET $P_1$. The gate driver 52 provides a second switching signal $SW_2$ to the gate of the P-FET $P_1$ to control the P-FET $P_1$ as a switch. Thus, the N-FET $N_1$ and the P-FET $P_1$ are operated in a complementary manner wherein both switches are not on at the same time. In addition, the gate driver 52 is configured to provide a predetermined dead time after the N-FET $N_1$ is turned off and before the P-FET $P_1$ is turned on, and vice versa.

Lossless snubber capacitors $C_2$ and $C_3$ are connected in parallel across the drain and source terminals of the N-FET $N_1$ and P-FET $P_1$, respectively. These lossless snubber capacitors $C_2$ and $C_3$ reduce the turn-off losses of the N-FET $N_1$ and the P-FET $P_1$ by limiting the voltage across the N-FET $N_1$ and the P-FET $P_1$ to a voltage $V_{CR}$ across the reset capacitor $C_R$. The snubber capacitors $C_2$ and $C_3$ may be implemented as discrete capacitors, the stray capacitances associated with the N-FET $N_1$ and the P-FET $P_1$, or a combination of both. Additionally, diodes $D_1$ and $D_2$ are demonstrated as connected across the drain and source terminals of the N-FET $N_1$ and the P-FET $P_1$, respectively. The diodes $D_1$ and $D_2$ are used, together with the reset capacitor $C_R$ and the magnetizing inductance of transformer 56, to minimize turn-on losses of the N-FET $N_1$ and the P-FET $P_1$. As an example, the N-FET $N_1$ and the P-FET $P_1$ can be implemented as MOSFETS, such that the body diodes of MOSFETS may be used for the diodes $D_1$ and $D_2$. Alternatively, the diodes $D_1$ and $D_2$ can be implemented as discrete diodes.

The reset capacitor $C_R$, in combination with the magnetizing inductance and the N-FET $N_1$ and the P-FET $P_1$, automatically transfer the energy stored in the core of the transformer 56 back to the input voltage $V_{IN}$ when the N-FET $N_1$ is turned off, as well as enable zero-voltage turn-on of the N-FET $N_1$ and the P-FET $P_1$. In particular, once the N-FET $N_1$ is turned off, the energy stored in the core of the transformer 56 charges the reset capacitor $C_R$, forward biasing the diode $D_2$ across the P-FET $P_1$ to enable the P-FET $P_1$ to turn on while the diode $D_2$ is conducting, which, in turn, enables the P-FET $P_1$ to be turned on at zero voltage. Once the P-FET $P_1$ is turned on, the energy stored in the core of the transformer 56 is automatically returned to the input voltage $V_{IN}$. The reset capacitor $C_R$ also forward biases the diode $D_1$ to enable turn on of the N-FET $N_1$ while the diode $D_1$ is conducting, thereby allowing the N-FET $N_1$ to be turned on at zero volts. As will be discussed in more detail below, the turn-off voltage stress across the N-FET $N_1$ and the P-FET $P_1$ is limited to the voltage $V_{CR}$ across the reset capacitor $C_R$.

As mentioned above, the transformer 56 includes dual secondary windings that can, for example, have an equal number of turns. The power stage 54 includes an N-FET $N_2$ and an N-FET $N_3$ that are coupled to the secondary winding of the transformer 56 and which are arranged as a self-driven synchronous rectifier stage. Particularly, the N-FET $N_2$ includes a drain that is coupled to a first end of the secondary winding of the transformer 56 and a source that is coupled to the low-voltage rail, and the N-FET $N_3$ includes a drain that is coupled to a second end of the secondary winding of the transformer 56 and a source that is coupled to the low-voltage rail. The N-FET $N_2$ includes a gate that is coupled to the second end of the secondary winding of the transformer 56 and a drain of the N-FET $N_3$, and the N-FET $N_3$ includes a gate that is coupled to the first end of the secondary winding of the transformer 56 and a drain of the N-FET $N_2$.

As described in greater detail herein, the N-FET $N_2$ and the N-FET $N_3$ are alternately activated and deactivated in response to respectively conducting a secondary current through the respective portions of the secondary winding of the transformer 56. The secondary current is induced in response to the primary current $I_1$ flowing through the primary winding of the transformer 56, and is provided through an LC low-pass filter formed by an output inductor $L_{OUT}$ and an output capacitor $C_{OUT}$ to generate the output voltage $V_{OUT}$ at an output 60. In the example of FIG. 2, a feedback current $I_{FB}$ is provided from the output 60 to the feedback stage, such as the feedback stage 18 in the example of FIG. 1, such as demonstrated in greater detail in the example of FIG. 5. A freewheeling diode $D_3$ is connected across the input of the LC low-pass filter. The freewheeling diode $D_3$ in combination with the N-FET $N_2$ and the N-FET $N_3$ keeps the load current flowing through the secondary winding during the transition time of the N-FET $N_1$ and P-FET $P_1$.

During a first switching phase, the N-FET $N_1$ is activated by the gate driver 52, while the diode $D_1$ is conducting, as will be discussed in more detail below. Once the N-FET $N_1$ is turned on, the current $I_1$ flows from the input voltage $V_{IN}$ through the primary winding of the transformer 56, the drain and source terminals of the N-FET $N_1$ and back to the low-voltage rail. As will be discussed in more detail below, the N-FET $N_1$ is turned on while the diode $D_1$ is conducting, resulting in essentially a zero-voltage turn-on for the N-FET $N_1$, thus mitigating switching losses associated with the turning-on of the N-FET $N_1$. After the N-FET $N_1$ is turned on, the electrical current through the primary winding of the transformer 56 linearly ramps up as a function of the magnetizing inductance of the primary winding of the transformer 56.

During the first switching phase, energy is transferred from the primary winding of the transformer 56 to the secondary winding of the transformer 56 and, in turn, to the load connected across the capacitor $C_{OUT}$. Also during the first switching phase, the N-FET $N_3$ is activated to conduct the secondary current from ground through the N-FET $N_3$ and through the second portion of the secondary winding of the transformer 56, to the output inductor $L_{OUT}$, and to the load. As the secondary current flows through the N-FET $N_3$, the voltage at the drain of the N-FET $N_3$, and thus the gate of the N-FET $N_2$, increases.

Immediately after the N-FET $N_1$ is turned off, the switching power converter circuit 50 enters a soft transition mode. In this mode, the freewheeling diode $D_3$ allows for soft switching of the N-FETs $N_2$ and $N_3$. In particular, immediately after the N-FET $N_1$ is turned off (during the dead time before the P-FET $P_1$ is turned on) the voltage across the primary winding of the transformer 56 transitions from positive to negative. During this period, the primary current $I_1$ through the primary winding of the transformer 56 is positive. The primary current $I_1$ through the primary winding charges the reset capacitor $C_R$, which, in turn, forward biases the diode $D_2$ connected across the P-FET $P_1$, which allows the primary current $I_1$ to flow through the diode $D_2$. During this mode, the snubber capacitor $C_2$, connected across the drain and source terminals of the N-FET $N_1$, is slowly charged to a value $V_{CR}$, equal to the voltage across the reset capacitor $C_R$, thus limiting the voltage stress associated with the turn off of the N-FET $N_1$.

While the voltage across the primary winding of the transformer 56 is greater than zero, the secondary current flows from the low-voltage rail, through the N-FET $N_3$, through the second portion of the secondary winding of the transformer 56, and through the output inductor $L_{OUT}$ to the load. Once the voltage across the primary winding drops below zero, the freewheeling diode $D_3$ causes electrical current to circulate through the freewheeling diode $D_3$, through the output inductor $L_{OUT}$ and to the load. The increase in the gate voltage of the N-FET $N_2$ begins to activate the N-FET $N_2$, which thus likewise begins to deactivate the N-FET $N_3$. As a result, the secondary current begins to be diverted from the N-FET $N_3$ to the freewheeling diode $D_3$. As the amplitude of the secondary current in the N-FET $N_3$ approaches zero, the N-FET $N_2$ becomes fully activated (e.g., saturation mode) and the N-FET $N_3$ becomes fully deactivated (e.g., cutoff mode). Therefore, the N-FET $N_3$ experiences substantially zero switching losses, and is thus soft-switched.

Once the P-FET $P_1$ turns on in a second switching phase, the primary current $I_1$ through the primary winding of the transformer 56 switches polarity. While the primary current $I_1$ is positive, the switching power converter circuit 50 operates in an auxiliary forward ("flyback") mode corresponding to the second switching phase. In the second switching phase, the P-FET $P_1$ is turned on while the diode $D_2$ is conducting, realizing zero-voltage switching of the P-FET $P_1$. Since the voltage across the primary winding is negative during this period, the N-FET $N_2$ conducts the secondary current from the low-voltage rail through the N-FET $N_2$, through the first portion of the secondary winding of the transformer 56, and through the output inductor $L_{OUT}$ to the load. As the secondary current flows through the N-FET $N_2$, the voltage at the drain of the N-FET $N_2$, and thus the gate of the N-FET $N_3$, increases.

After the P-FET $P_1$ is turned off, the switching power converter circuit 50 again transitions to the first switching phase. As discussed above, a dead-time exists between the turn-off of the P-FET $P_1$ and the turn-on of the N-FET $N_1$. During this deadtime, the voltage on the primary winding of the transformer 56 ramps up linearly to a positive value. Immediately after the P-FET $P_1$ is turned off, the primary current $I_1$ continues to flow from the low-voltage rail through the P-FET $P_1$, the reset capacitor $C_R$, through the primary winding, and back to the input voltage $V_{IN}$. The primary current $I_1$ also flows from the low-voltage rail through the snubber capacitor $C_2$, thereby discharging the snubber capacitor $C_2$ to allow the diode $D_1$ to turn on, which, in turn, enables the N-FET $N_1$ to be turned on at zero voltage during the first switching phase. Once the P-FET $P_1$ is turned off, the snubber $C_3$ limits the voltage across the P-FET $P_1$ to a voltage $V_{CR}$ corresponding to the voltage across the reset capacitor $C_R$.

Similar to as described previously, once the reverse polarity voltage across the primary winding drops below zero, the freewheeling diode $D_3$ causes electrical current to circulate through the freewheeling diode $D_3$, through the output inductor $L_{OUT}$ and to the load. The increase in the gate voltage of the N-FET $N_3$ begins to activate the N-FET $N_3$, which thus likewise begins to deactivate the N-FET $N_2$. As a result, the secondary current begins to be diverted from the N-FET $N_2$ to the freewheeling diode $D_3$. As the amplitude of the secondary current in the N-FET $N_2$ approaches zero, the N-FET $N_3$ becomes fully activated (e.g., saturation mode) and the N-FET $N_2$ becomes fully deactivated (e.g., cutoff mode). Therefore, the N-FET $N_3$ experiences substantially zero switching losses, and is thus soft-switched. Accordingly, the switching power converter circuit 50 can transition between the first and second switching phases with soft-switching of the N-FETs $N_2$ and $N_3$, and thus providing self-driven rectification of the secondary current that is synchronous with the first and second switching phases.

The self-driven synchronous rectifier stage formed by the N-FETs $N_2$ and $N_3$ provides better efficiency of the switching power converter system 50 relative to typical switching power converters that implement diode rectification at the secondary winding of the transformer, such as described in U.S. Pat. No. 5,973,939. As an example, diode rectification may not be efficient enough for power processing and management at sub-volts, such as required by next-generation radio frequency (RF) and digital payloads for aerospace applications based on the diode forward-bias voltage drop forming a significant portion of the output voltage. However, the N-FETs $N_2$ and $N_3$ can have a very low channel resistance when fully activated (e.g., saturation mode), such as in the range of approximately less than ten milliohms. Accordingly, the N-FETs $N_2$ and $N_3$ can provide a significantly reduced voltage drop when activated, relative to the 0.7 volt drop of diodes or the 0.4 volt drop of Schottky diodes. Additionally, because the N-FETs $N_2$ and $N_3$ are activated by the secondary current flowing through each other and through the respective portions of the secondary winding of the transformer 56 based on the mutual gate coupling to the respective ends of the secondary winding, the N-FETs $N_2$ and $N_3$ are self-driven. As a result, the activation of the N-FETs $N_2$ and $N_3$ are synchronous with respect to the switching phases based on the activation of the N-FET $N_1$ and the P-FET $P_1$ to provide simplicity, efficiency, and automatic dead-time control over load and line changes.

Figure 3:
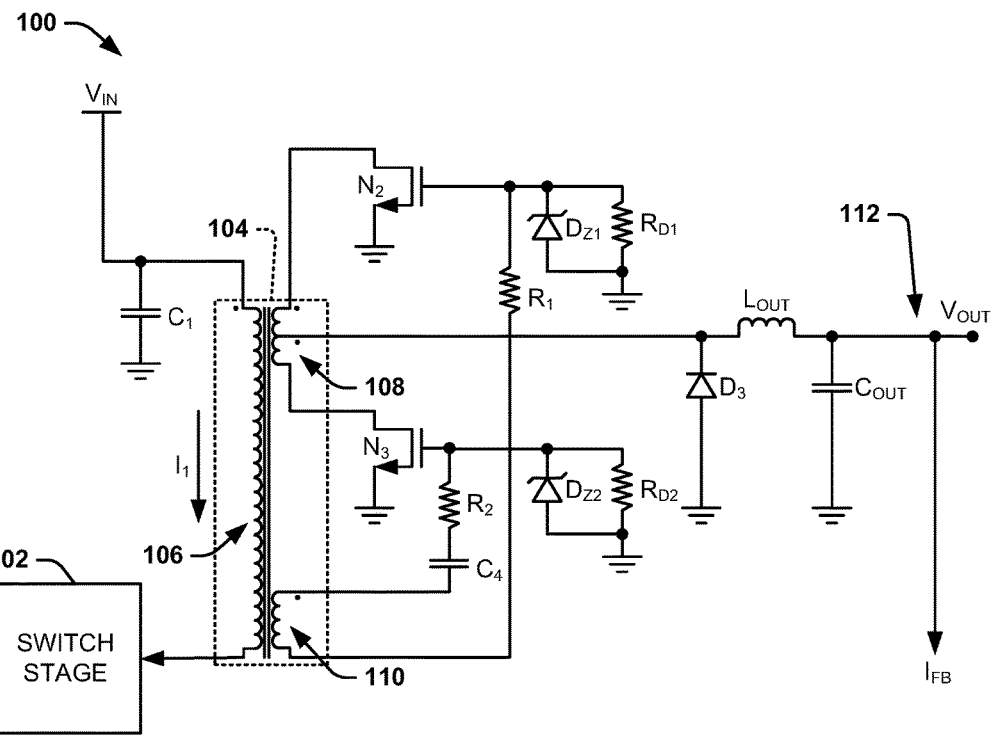
FIG. 3 illustrates an example of a power stage.

FIG. 3 illustrates an example of a power stage 100. The power stage 100 can be implemented in any of a variety of applications that require generating a regulated output voltage $V_{OUT}$ based on an input voltage $V_{IN}$. As an example, the power stage 100 can correspond to a portion of the switching power converter system in the diagram 10 of the example of FIG. 1.

The power stage 100 includes a switch stage 102, which can be arranged substantially the same as the switch stage 57 in the example of FIG. 2 to conduct the current $I_1$. In addition, the power stage 100 includes a transformer 104 having a single primary winding 106 and dual secondary windings 108 each with equal turns. The transformer 104 further includes a tertiary winding 110 that is magnetically coupled with the primary winding 106. The polarities of the primary and secondary windings are as indicated by the dots in FIG. 3. The input voltage $V_{IN}$ is likewise coupled to the primary winding of the transformer 104 over a capacitor $C_1$.

As mentioned above, the transformer 104 includes dual secondary windings 108 each having an equal number of turns. The power stage 100 includes an N-FET $N_2$ and an N-FET $N_3$ that each interconnect a respective end of the secondary winding 108 of the transformer 104 (at a drain) and the low-voltage rail (e.g., ground, at a source). In the example of FIG. 3, the N-FET $N_2$ has a gate that is coupled to a first end of the tertiary winding 110 via a resistor $R_1$, and the N-FET $N_3$ has a gate that is coupled to a second end of the tertiary winding 110 via a resistor $R_2$ and a capacitor $C_4$. Additionally, a zener diode $D_{Z1}$ and a damping resistor $R_{D1}$ interconnect the gate of the N-FET $N_2$ and the low-voltage rail, and a zener diode $D_{Z2}$ and a damping resistor $R_{D2}$ interconnect the gate of the N-FET $N_3$ and the low-voltage rail.

The arrangement of the tertiary winding 110 of the transformer 104 with respect to the gates of the N-FETs $N_2$ and $N_3$ provides that the N-FETs $N_2$ and $N_3$ are arranged as a self-driven synchronous rectifier stage. Particularly, the N-FET $N_2$ and the N-FET $N_3$ are alternately activated and deactivated in response to the tertiary winding 110 conducting a tertiary current $I_3$. The tertiary current is induced in response to the primary current $I_1$ flowing through the primary winding 106 of the transformer 104, such that the alternating direction of the primary current $I_1$ dictates the alternating direction of the tertiary current $I_3$, with the alternating direction of the tertiary current providing for the alternating activation of the N-FETs $N_2$ and $N_3$. Additionally, the damping resistors $R_{D1}$ and $R_{D2}$ provide for substantial mitigation of ringing that can occur in the switching of the N-FETs $N_2$ and $N_3$.

As a result of the alternating activation of the N-FETs $N_2$ and $N_3$, the secondary current is provided through an LC low-pass filter formed by an output inductor $L_{OUT}$ and an output capacitor $C_{OUT}$ to generate the output voltage $V_{OUT}$ at an output 112, similar to as described previously in the example of FIG. 2. In the example of FIG. 3, a feedback current $I_{FB}$ is provided from the output 112 to the feedback stage, such as the feedback stage 18 in the example of FIG. 1, such as demonstrated in greater detail in the example of FIG. 5. A freewheeling diode $D_3$ is connected across the input of the LC low-pass filter. The freewheeling diode $D_3$ in combination with the N-FET $N_2$ and the N-FET $N_3$ keeps the load current flowing through the secondary winding during the transition time of the N-FET $N_1$ and P-FET $P_1$. The self-driven synchronous rectifier stage formed by the N-FETs $N_2$ and $N_3$ and the tertiary winding 110 of the transformer 104 therefore provides for another example of a more efficient switching power converter circuit relative to typical switching power converters that implement diode rectification at the secondary winding of the transformer.

Figure 4:
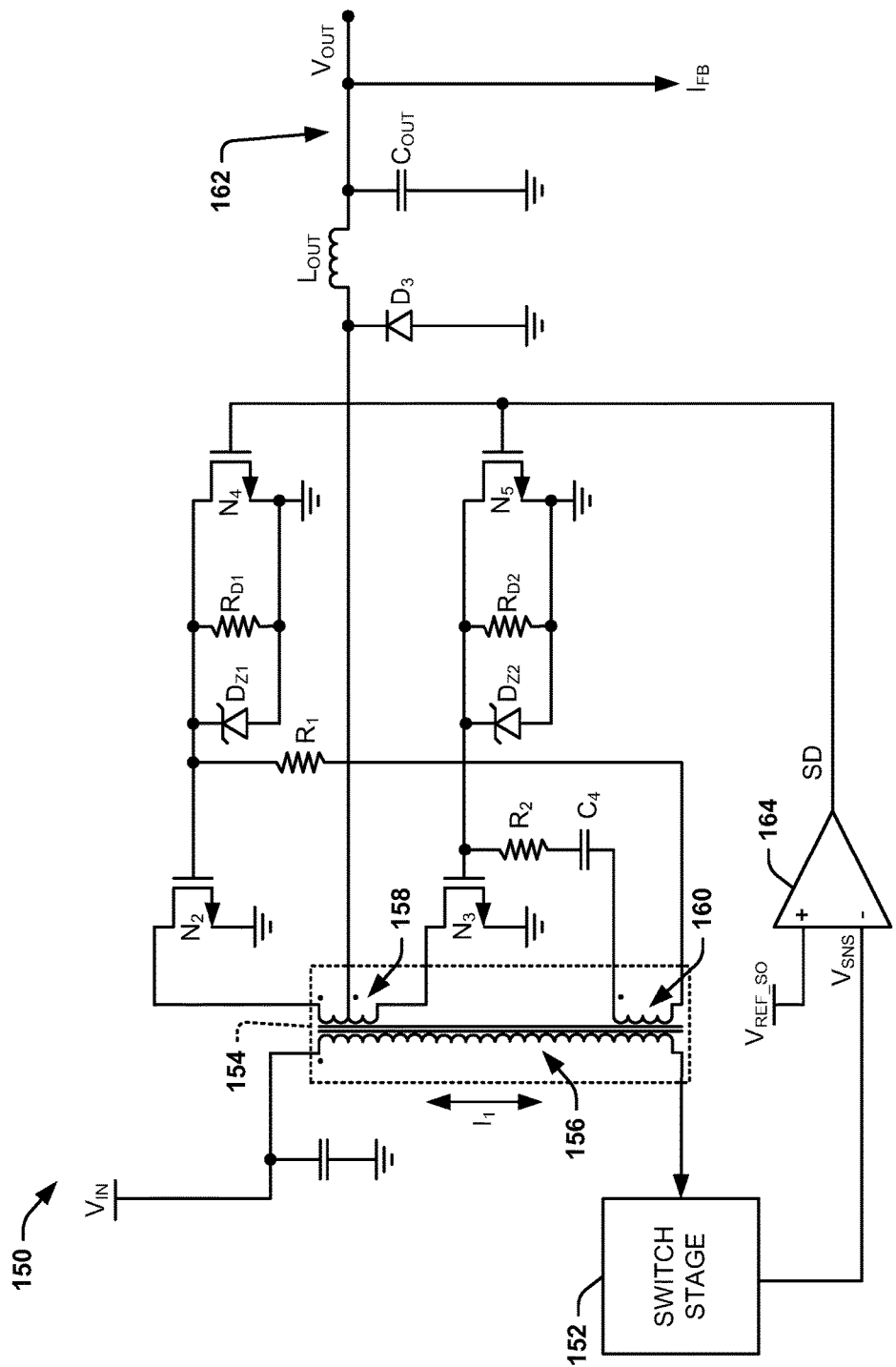
FIG. 4 illustrates another example of a power stage.

FIG. 4 illustrates an example of a power stage 150. The power stage 150 can be implemented in any of a variety of applications that require generating a regulated output voltage $V_{OUT}$ based on an input voltage $V_{IN}$. As an example, the power stage 150 can correspond to a portion of the switching power converter system in the diagram 10 of the example of FIG. 1.

The power stage 150 includes a switch stage 152, which can be arranged substantially the same as the switch stage 57 in the example of FIG. 2 to conduct the current $I_1$. In addition, the power stage 150 includes a transformer 154 having a single primary winding 156 and dual secondary windings 158 each with equal turns. The transformer 154 further includes a tertiary winding 160 that is magnetically coupled with the primary winding 156. The polarities of the primary and secondary windings are as indicated by the dots in FIG. 4. The input voltage $V_{IN}$ is likewise coupled to the primary winding of the transformer 154 over a capacitor $C_1$.

As mentioned above, the transformer 154 includes dual secondary windings 158 each having an equal number of turns. The power stage 150 includes an N-FET $N_2$ and an N-FET $N_3$ that each interconnect a respective end of the secondary winding 158 of the transformer 154 (at a drain) and the low-voltage rail (e.g., ground, at a source). In the example of FIG. 4, the N-FET $N_2$ has a gate that is coupled to a first end of the tertiary winding 160 via a resistor $R_1$, and the N-FET $N_3$ has a gate that is coupled to a second end of the tertiary winding 160 via a resistor $R_2$ and a capacitor $C_4$. Additionally, a zener diode $D_{Z1}$ and a damping resistor $R_{D1}$ interconnect the gate of the N-FET $N_2$ and the low-voltage rail, and a zener diode $D_{Z2}$ and a damping resistor $R_{D2}$ interconnect the gate of the N-FET $N_3$ and the low-voltage rail. Therefore, the arrangement of the tertiary winding 160 of the transformer 154 with respect to the gates of the N-FETs $N_2$ and $N_3$ provides that the N-FETs $N_2$ and $N_3$ are arranged as a self-driven synchronous rectifier stage based on activation via the tertiary current $I_3$, similar to as described previously in the example of FIG. 3. Accordingly, the alternating activation of the N-FETs $N_2$ and $N_3$ can provide the secondary current through the LC low-pass filter to generate the output voltage $V_{OUT}$ at an output 162, similar to as described previously in the example of FIG. 3. The self-driven synchronous rectifier stage formed by the N-FETs $N_2$ and $N_3$ and the tertiary winding 160 of the transformer 154 therefore provides for another example of a more efficient switching power converter circuit relative to typical switching power converters that implement diode rectification at the secondary winding of the transformer.

Furthermore, the power stage 150 includes a first shutoff transistor $N_4$ interconnecting the gate of the N-FET $N_2$ (at a drain) and the low-voltage rail (at a source), and a second shutoff transistor $N_5$ interconnecting the gate of the N-FET $N_3$ (at a drain) and the low-voltage rail (at a source). The shutoff transistors $N_4$ and $N_5$ have gates that are each coupled to a deactivation signal SD. In the example of FIG. 4, the power stage 150 further includes a comparator 164 that is configured to compare a sense voltage $V_{SNS}$ with a predetermined shutoff reference voltage $V_{REF\_SO}$. As an example, the sense voltage $V_{SNS}$ can be associated with an amplitude of the primary current $I_1$, such as an absolute value amplitude, that is provided from the switch stage 152. Therefore, in response to the gate driver (e.g., the gate driver 12) ceasing the switching operation, and thus decreasing the amplitude of the primary current $I_1$, the comparator 164 can assert the deactivation signal SD in response to the sense voltage $V_{SNS}$ decreasing less than the predetermined shutoff reference voltage $V_{REF\_SO}$. As a result, the shutoff transistors $N_4$ and $N_5$ can activate to respectively deactivate the N-FETs $N_2$ and $N_3$. For example, the comparator 164 can be a hysteretic comparator, such that the deactivation signal SD can be maintained for sufficient time to maintain activation of the shutoff transistors $N_4$ and $N_5$. Additionally, any residual gate voltage amplitude of the N-FETs $N_2$ and/or $N_3$ can be dissipated via the shutoff transistors $N_4$ and/or $N_5$ to the low-voltage rail, or through the damping resistors $R_{D1}$ and/or $R_{D2}$ in the event of failure of the shutoff transistors $N_4$ and/or $N_5$.

Figure 5:
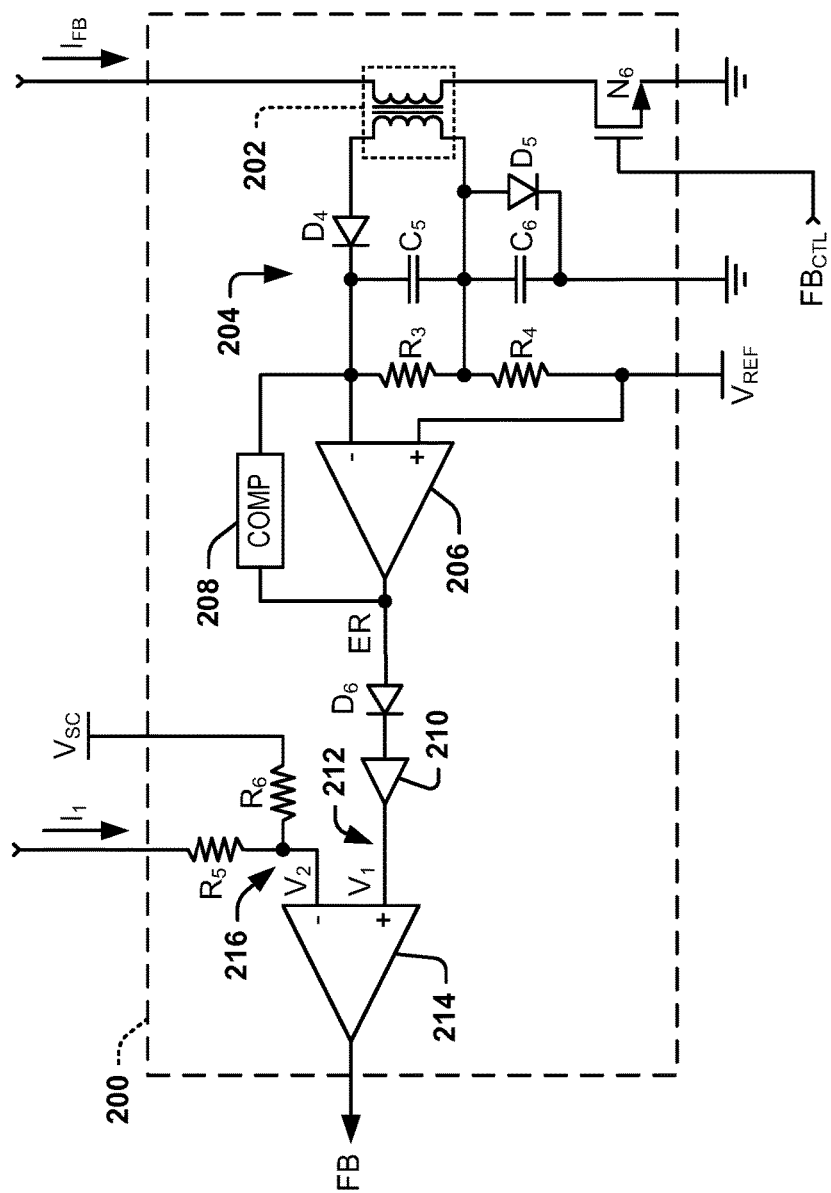
FIG. 5 illustrates an example of a feedback stage.

FIG. 5 illustrates an example of a feedback stage 200. The feedback stage 200 is configured to generate a feedback signal FB based on the output voltage $V_{OUT}$. The feedback stage 200 can correspond to the feedback stage 18 in the example of FIG. 1. Therefore, reference is to be made to the examples of FIGS. 1-4 in the following description of the example of FIG. 5.

The feedback stage 200 includes an isolation transformer 202 that is configured to receive the feedback current $I_{FB}$, such as provided from the output 60 of the power stage 54, the output 112 in the example of FIG. 3, or the output 162 in the example of FIG. 4. The feedback current $I_{FB}$ is provided through a primary winding and through an N-channel isolation FET $N_6$. The isolation FET $N_6$ is controlled by a feedback control signal $FB_{CTL}$ that can periodically activate the isolation FET $N_6$ to provide the feedback current $I_{FB}$ as an AC current through the primary winding of the isolation transformer 202. As an example, the feedback control signal $FB_{CTL}$ can be provided from a controller, such as the gate driver 52, or can be coupled to the secondary winding of the transformer 56, such that the activation of the isolation FET $N_6$ can be substantially synchronous with the switching phases. The feedback stage 200 also includes a rectifier 204 formed by a diode $D_4$ in combination with an RC filter formed by a resistor $R_3$ and a capacitor $C_5$. The isolation transformer 202 induces an AC secondary feedback current that is rectified by the rectifier 204 to provide a rectified feedback voltage $V_{FB}$ at an inverting input of an error amplifier 206. The error amplifier 206 is configured to generate an error signal ER based on a difference in amplitude between the rectified feedback voltage $V_{FB}$ and a reference voltage $V_{REF}$ and based on compensation feedback, demonstrated at 208.

In the example of FIG. 5, the rectifier also includes an additional diode $D_5$, an additional resistor $R_4$, and an additional capacitor $C_6$. The diode $D_5$ is demonstrated as arranged in parallel with the capacitor $C_6$ between the secondary winding of the isolation transformer 202 and the low-voltage rail (e.g., ground). Thus, the secondary winding of the isolation transformer 202 interconnects the parallel diode $D_5$ (at the anode) and capacitor $C_6$ and the anode of the diode $D_4$. Additionally, the resistor $R_4$ interconnects the resistor $R_3$ and the reference voltage $V_{REF}$. As an example, the resistors $R_3$ and $R_4$ can be fabrication-matched, such that the resistors $R_3$ and $R_4$ can be substantially identical and can exhibit substantially the same characteristics with respect to process and temperature variations. Similarly, the diodes $D_4$ and $D_5$ can be fabrication-matched, and the capacitors $C_5$ and $C_6$ can be fabrication-matched, and thus substantially identical with respect to each other, respectively.

Based on the fabrication matching of the resistors $R_3$ and $R_4$, the diodes $D_4$ and $D_5$, and the capacitors $C_5$ and $C_6$, and based on the arrangement thereof, the rectifier 204 can provide temperature compensation in generating the error signal ER, and thus the feedback signal FB. Particularly, as described herein, the temperature compensation provided by the rectifier is such that any variations of the reference voltage $V_{REF}$ based on changes in temperature are proportionally the same with respect to the rectified feedback voltage $V_{FB}$. As a result, the error signal ER is substantially unaffected by variations in temperature, thus resulting in a feedback signal FB that is substantially unaffected by variations in temperature. Accordingly, the switching power converter circuit 50 can provide accurate regulation of the amplitude of the output voltage $V_{OUT}$ regardless of environmental considerations.

The error signal ER is provided through a diode $D_6$ and through a buffer 210 before being provided to at a node 212 that is coupled to a non-inverting input of a comparator 214. The comparator 214 is configured to compare a voltage $V_1$ at the node 212 and a voltage $V_2$ at a node 216 that is coupled to the inverting input of the comparator 214. The voltage $V_2$ is based on the primary current $I_1$ provided from the power stage 52 in the example of FIGS. 2-4 being provided through a resistor $R_5$ and a slope compensation voltage $V_{SC}$ provided via a resistor $R_6$. Therefore, the voltage $V_2$ is provided as a ramp voltage. The comparator 214 thus generates the feedback signal FB based on the comparison of the voltages $V_1$ and $V_2$. Accordingly, the feedback signal FB defines the pulse-width modulation of the switching signals $SW_1$ and $SW_2$, as generated by the gate driver 52, to define the first and second switching phases corresponding to the respective activation of the N-FET $N_1$ and the P-FET $P_1$, and thus the amplitude of the output voltage $V_{OUT}$, as described previously.

The feedback stage 200 thus provides feedback with respect to the operation of the switching power converter circuit 50, where the current and voltage loops are closed in an isolated manner. Particularly, by implementing the isolation transformer 202 and the isolation FET $N_6$, the feedback stage 200 is configured as a "chopper" circuit that chops the output voltage $V_{OUT}$ and reconstructs it after crossing the isolation boundary formed by the isolation transformer 202. Thus, the feedback stage 200 exhibits a more efficient and simplistic behavior relative to other isolation circuits, such as opto-isolators that are affected by ambient conditions and are more complex. Additionally, as described previously, the feedback stage 200 provides the feedback signal FB in a temperature-compensated manner to provide better regulation of the output voltage $V_{OUT}$.

What have been described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, the example embodiments are intended to embrace all such alterations, modifications and variations that fall within the spirit and scope of the appended claims.

What is claimed is:

1. A switching power converter circuit comprising:
a gate driver configured to generate at least one switching signal in response to a feedback signal;
a feedback stage configured to generate the feedback signal based on an amplitude of an output voltage at an output; and
a power stage comprising at least one switch and a transformer, the at least one switch being controlled via the respective at least one switching signal to provide a primary current through a primary winding of the transformer to induce a secondary current through a secondary winding of the transformer to generate the output voltage, the power stage further comprising a self-driven synchronous rectifier stage coupled to the secondary winding to conduct the secondary current from a low voltage rail through the secondary winding, the self-driven synchronous rectifier stage comprises:
a first transistor interconnecting a first end of the secondary winding and the low voltage rail and being configured to conduct the secondary current from the low voltage rail through a first portion of the secondary winding when activated during a first switching phase; and
a second transistor interconnecting a second end of the secondary winding and the low voltage rail and being configured to conduct the secondary current from the low voltage rail through a second portion of the secondary winding when activated during a second switching phase.

2. The circuit of claim 1, wherein the first transistor comprises a gate that is coupled to the second end of the secondary winding and a drain of the second transistor, and wherein the second transistor comprises a gate that is coupled to the first end of the secondary winding and a drain of the first transistor, such that the first transistor is activated in the second switching phase to conduct the secondary current through the first portion of the secondary winding in response to an increase in a gate voltage of the first transistor based on the secondary current flowing through the second transistor, and wherein the second transistor is activated in the first switching phase to conduct the secondary current through the second portion of the secondary winding in response to an increase in a gate voltage of the second transistor based on the secondary current flowing through the first transistor.

3. The circuit of claim 1, wherein the transformer further comprises a tertiary winding configured to generate a tertiary current that is induced in response to the primary current through the primary winding, wherein the first transistor comprises a gate that is coupled to a first end of the tertiary winding and the second transistor comprises a gate that is coupled to a second end of the tertiary winding, such that the first transistor is activated in the second switching phase to conduct the secondary current through the first portion of the secondary winding in response to an increase in a gate voltage of the first transistor based on the tertiary current flowing through the tertiary winding, and wherein the second transistor is activated in the first switching phase to conduct the secondary current through the second portion of the secondary winding in response to an increase in a gate voltage of the second transistor based on the tertiary current flowing through the tertiary transistor.

4. The circuit of claim 3, further comprising a hysteretic comparator configured to compare a voltage associated with the primary current with a predetermined shutoff reference voltage and to generate a deactivation signal to deactivate the first transistor and the second transistor in response to the voltage associated with the primary current decreasing less than the predetermined shutoff reference voltage.

5. The circuit of claim 4, further comprising:
a first deactivation transistor configured to deactivate the first transistor in response to the deactivation signal;
a second deactivation transistor configured to deactivate the second transistor in response to the deactivation signal;
a first damping resistor coupled to a gate of the first transistor in parallel with the first deactivation transistor; and
a second damping resistor coupled to a gate of the second transistor in parallel with the second deactivation transistor, the first and second damping resistors being configured to substantially mitigate ringing associated with the switching of the first and second transistors in the respective first and second switching phases, and to provide circuit protection in response to failure of the first and second deactivation transistors, respectively.

6. The circuit of claim 1, wherein the at least one switch comprises:
a first switch that is activated via a first switching signal to provide the primary current in a first direction through the primary winding of the transformer, such that the secondary current is induced from the low voltage rail through the second transistor and the second portion of the secondary winding to the output during the first switching phase; and
a second switch that is activated via a second switching signal to provide the primary current in a second direction through the primary winding of the transformer opposite the first direction, such that the secondary current is induced from the low voltage rail through the first transistor and the first portion of the secondary winding to the output during the second switching phase.

7. The circuit of claim 1, wherein the feedback stage comprises pairs of fabrication-matched circuit components to generate the feedback signal based on the output voltage in a temperature-compensated manner.

8. The circuit of claim 1, wherein the feedback stage comprises:
an isolation transformer comprising a primary winding configured to conduct a feedback current associated with the output voltage and a secondary winding configured to generate a secondary feedback current based on the feedback current; and
a rectifier configured to rectify the secondary feedback current, the feedback stage being configured to generate the feedback signal based on the rectified secondary feedback current.

9. The circuit of claim 8, wherein the feedback stage comprises an error amplifier configured to generate an error signal corresponding to a difference in amplitude between the rectified secondary feedback current and a reference voltage, wherein the rectifier comprises:
a first diode coupled to the secondary winding of the isolation transformer;
a second diode coupled to the secondary winding of the isolation transformer;
an RC filter comprising a first resistor and a first capacitor in a parallel arrangement between a cathode of the first diode and the secondary winding of the isolation transformer;
a second resistor interconnecting the RC filter and the reference voltage; and
a second capacitor interconnecting the RC filter and the low voltage rail, wherein the second diode, the second resistor, and the second capacitor are fabrication-matched components with respect to the first diode, the first resistor, and the first capacitor, respectively, to provide temperature compensation with respect to the rectified secondary feedback current.

10. A switching power converter circuit comprising:
a gate driver configured to generate a pair of switching signals in response to a feedback signal;
a feedback stage configured to generate the feedback signal based on an amplitude of an output voltage at an output; and
a power stage comprising a pair of switches and a transformer, the pair of switches being alternately activated via the respective pair of switching signals in a first switching phase and a second switching phase to provide a primary current through a primary winding of the transformer to induce a secondary current through a secondary winding of the transformer to generate the output voltage, the power stage further comprising a pair of transistors arranged as a self-driven synchronous rectifier stage coupled to the secondary winding to conduct the secondary current from a low voltage rail through the secondary winding, the pair of transistors being configured to alternately activate in the first and second switching phases in response to respectively conducting the secondary current in each of the first and second switching phases, wherein the pair of transistors comprises:
a first transistor interconnecting a first end of the secondary winding and the low voltage rail and being configured to conduct the secondary current from the low voltage rail through a first portion of the secondary winding during a first switching phase; and
a second transistor interconnecting a second end of the secondary winding and the low voltage rail and being configured to conduct the secondary current from the low voltage rail through a second portion of the secondary winding during a second switching phase, wherein the first transistor comprises a gate that is coupled to the second end of the secondary winding and a drain of the second transistor, and wherein the second transistor comprises a gate that is coupled to the first end of the secondary winding and a drain of the first transistor.

11. The circuit of claim 10, wherein the transformer further comprises a tertiary winding configured to generate a tertiary current that is induced in response to the primary current through the primary winding, wherein the first transistor comprises a gate that is coupled to a first end of the tertiary winding and the second transistor comprises a gate that is coupled to a second end of the tertiary winding, such that the first transistor is activated in the second switching phase to conduct the secondary current through the first portion of the secondary winding in response to an increase in a gate voltage of the first transistor based on the tertiary current flowing through the tertiary winding, and wherein the second transistor is activated in the first switching phase to conduct the secondary current through the second portion of the secondary winding in response to an increase in a gate voltage of the second transistor based on the tertiary current flowing through the tertiary transistor.

12. The circuit of claim 10, wherein the feedback stage comprises:
   an isolation transformer comprising a primary winding configured to conduct a feedback current associated with the output voltage and a secondary winding configured to generate a secondary feedback current based on the feedback current; and
   a rectifier configured to rectify the secondary feedback current, the feedback stage being configured to generate the feedback signal based on the rectified secondary feedback current.

13. The circuit of claim 12, wherein the feedback stage comprises an error amplifier configured to generate an error signal corresponding to a difference in amplitude between the rectified secondary feedback current and a reference voltage, wherein the rectifier comprises:
   a first diode coupled to the secondary winding of the isolation transformer;
   a second diode coupled to the secondary winding of the isolation transformer;
   an RC filter comprising a first resistor and a first capacitor in a parallel arrangement between a cathode of the diode and the secondary winding of the isolation transformer;
   a second resistor interconnecting the RC filter and the reference voltage; and
   a second capacitor interconnecting the RC filter and the low voltage rail, wherein the second diode, the second resistor, and the second capacitor are fabrication-matched components with respect to the first diode, the first resistor, and the first capacitor, respectively, to provide temperature compensation with respect to the rectified secondary feedback current.

14. A switching power converter circuit comprising:
   a gate driver configured to generate at least one switching signal in response to a feedback signal;
   a power stage comprising at least one switch and a transformer, the at least one switch being controlled via the respective at least one switching signal to provide a primary current through a primary winding of the transformer to induce a secondary current through a secondary winding of the transformer to generate an output voltage, the power stage further comprising a self-driven synchronous rectifier stage coupled to the secondary winding to conduct the secondary current from a low voltage rail through the secondary winding; and
   a feedback stage comprising:
      an isolation transformer comprising a primary winding configured to conduct a feedback current associated with the output voltage and a secondary winding configured to generate a secondary feedback current based on the feedback current; and
      a rectifier configured to rectify the secondary feedback current, the feedback stage being configured to generate the feedback signal based on the rectified secondary feedback current in a temperature-compensated manner.

15. The circuit of claim 14, wherein the self-driven synchronous rectifier stage comprises:
   a first transistor interconnecting a first end of the secondary winding and the low voltage rail and being configured to conduct the secondary current from the low voltage rail through a first portion of the secondary winding during a first switching phase; and
   a second transistor interconnecting a second end of the secondary winding and the low voltage rail and being configured to conduct the secondary current from the low voltage rail through a second portion of the secondary winding during a second switching phase.

16. The circuit of claim 15, wherein the first transistor comprises a gate that is coupled to the second end of the secondary winding and a drain of the second transistor, and wherein the second transistor comprises a gate that is coupled to the first end of the secondary winding and a drain of the first transistor, such that the first transistor is activated in the second switching phase to conduct the secondary current through the first portion of the secondary winding in response to an increase in a gate voltage of the first transistor based on the secondary current flowing through the second transistor, and wherein the second transistor is activated in the first switching phase to conduct the secondary current through the second portion of the secondary winding in response to an increase in a gate voltage of the second transistor based on the secondary current flowing through the first transistor.

17. The circuit of claim 15, wherein the transformer further comprises a tertiary winding configured to generate a tertiary current that is induced in response to the primary current through the primary winding, wherein the first transistor comprises a gate that is coupled to a first end of the tertiary winding and the second transistor comprises a gate that is coupled to a second end of the tertiary winding, such that the first transistor is activated in the second switching phase to conduct the secondary current through the first portion of the secondary winding in response to an increase in a gate voltage of the first transistor based on the tertiary current flowing through the tertiary winding, and wherein the second transistor is activated in the first switching phase to conduct the secondary current through the second portion of the secondary winding in response to an increase in a gate voltage of the second transistor based on the tertiary current flowing through the tertiary transistor.

18. The circuit of claim 14, wherein the feedback stage comprises an error amplifier configured to generate an error signal corresponding to a difference in amplitude between the rectified secondary feedback current and a reference voltage, wherein the rectifier comprises:
   a first diode coupled to the secondary winding of the isolation transformer;
   a second diode coupled to the secondary winding of the isolation transformer;
   an RC filter comprising a first resistor and a first capacitor in a parallel arrangement between a cathode of the diode and the secondary winding of the isolation transformer;
   a second resistor interconnecting the RC filter and the reference voltage; and
a second capacitor interconnecting the RC filter and the low voltage rail, wherein the second diode, the second resistor, and the second capacitor are fabrication-matched components with respect to the first diode, the first resistor, and the first capacitor, respectively, to provide temperature compensation with respect to the rectified secondary feedback current.

* * * * *